US012395801B2

(12) United States Patent
Hansen et al.

(10) Patent No.: US 12,395,801 B2
(45) Date of Patent: Aug. 19, 2025

(54) HEARING DEVICE SYSTEM AND TOOL

(71) Applicant: GN Hearing A/S, Ballerup (DK)

(72) Inventors: Finn Hansen, Smørum (DK); Anders Hjermø Michaelsen, Bagsværd (DK)

(73) Assignee: GN HEARING A/S, Ballerup (DK)

( * ) Notice: Subject to any disclaimer, the term of this patent is extended or adjusted under 35 U.S.C. 154(b) by 154 days.

(21) Appl. No.: 17/705,231

(22) Filed: Mar. 25, 2022

(65) Prior Publication Data

US 2022/0217483 A1 Jul. 7, 2022

Related U.S. Application Data

(63) Continuation of application No. PCT/EP2020/080112, filed on Oct. 27, 2020.

(30) Foreign Application Priority Data

Oct. 30, 2019 (EP) .................................... 19206230

(51) Int. Cl.
*H04R 25/00* (2006.01)

(52) U.S. Cl.
CPC ......... *H04R 25/60* (2013.01); *H04R 2460/17* (2013.01)

(58) Field of Classification Search
CPC . H04R 1/00; H04R 1/02; H04R 1/028; H04R 1/10; H04R 1/1041; H04R 1/1066; H04R 1/1091; H04R 25/60; H04R 25/603; H04R 25/00; H04R 2460/17; H04R 25/65
See application file for complete search history.

(56) References Cited

U.S. PATENT DOCUMENTS

| | | | | |
|---|---|---|---|---|
| 6,491,464 | B1 * | 12/2002 | Young | B43K 29/05 401/35 |
| 7,554,752 | B2 * | 6/2009 | Tamaoki | G02B 6/4204 359/664 |
| 2011/0188691 | A1 * | 8/2011 | Gommel | H04R 25/60 381/329 |
| 2011/0206227 | A1 | 8/2011 | Flaig et al. | |
| 2014/0348614 | A1 * | 11/2014 | Martin | A44B 9/10 411/439 |
| 2019/0132690 | A1 | 5/2019 | Flaig et al. | |

FOREIGN PATENT DOCUMENTS

| | | |
|---|---|---|
| CN | 202103845 | 1/2012 |
| EP | 2456235 | 5/2012 |
| EP | 2645742 | 10/2013 |
| WO | WO 2007/003511 | 1/2007 |

OTHER PUBLICATIONS

Extended European search report dated Nov. 6, 2020 for EP 19206230.5.
PCT International Search Report and Written Opinion for International Appln. No. PCT/EP2020/080112 dated Jan. 19, 2021.
Foreign Exam Report for EP Patent Appln. No. 19206230.5 dated Jun. 20, 2023.
PCT International Preliminary Report on Patentability for International Appln. No. PCT/EP2020/080112 dated May 3, 2022.
Foreign Office Action dated Jun. 14, 2024 for Chinese Patent Application No. 202080075704.9.

* cited by examiner

*Primary Examiner* — Paul Kim
(74) *Attorney, Agent, or Firm* — Vista IP Law Group, LLP

(57) ABSTRACT

The present disclosure concerns a system comprising a hearing device and a tool, and the tool itself, for exchanging for example covers and/or filters and/or sealings in/on the hearing device.

23 Claims, 5 Drawing Sheets

HEARING DEVICE SYSTEM AND TOOL

RELATED APPLICATION DATA

This application is a continuation of International Patent Application No. PCT/EP2020/080112 filed on Oct. 27, 2020, which claims priority to, and the benefit of European Patent Application No. 19206230.5 filed on Oct. 30, 2019. The entire disclosures of the above applications are expressly incorporated by reference herein.

TECHNICAL FIELD

The present disclosure relates to a system comprising a hearing device and a separate tool with handle. The tool is adapted for enabling easy and quick exchange of a cover of the hearing device and thereby a filter of the cover. The present disclosure also relates to the tool itself.

BACKGROUND ART

Within the area of hearing devices for people with hearing loss, many different types of hearing devices are available on the market. One example of a hearing device is disclosed in EP 2 871 864 B1.

Disadvantages of some known modern hearing devices, among others, are that they are prone to get soiled and grubby or even grimy as being used close to a body and during activities, such as training/practice, due to outdoor use and perspiration etc. Many of known modern hearing devices are also small so as not to be too visible and to be more discreet, hence, handling of these small hearing devices may be relatively complicated and they may be difficult to use and put on, in particular if the user is visually impaired and/or has some other disability, such as reduced handfunction that makes it more difficult for the user to use the hands, especially their fine motorics.

SUMMARY

One object is to provide a system of a hearing device and a tool, and the tool itself, that enable easy change of hearing devices' cover/-s, filter/-s (dirt/audio filter/-s or the like), and/or sealing/-s, which solves or at least reduces one or more of above problems.

Another object is to provide a hearing device that is easy to maintain, in particular to keep clean and with remained functionality by being configured for easy change of its cover/-s, filter/-s (dirt/audio filter/-s or the like), and/or sealing/-s, which solves or at least reduces one or more of above problems.

In one aspect, one or more of the above objects are achieved by means of a hearing device.

According to the disclosure at least one of the objects is achieved by a hearing device comprising a hearing device housing having at least one microphone and a cover comprising at least one filter for covering an audio channel for channeling sound between surroundings and the at least one microphone arranged in the hearing device housing, the hearing device housing comprising a control unit and a power source, the hearing device housing comprises a sealing for sealing the interior of the hearing device housing against damp, moist, dirt and dust for protection of the control unit and the power source, the control unit being operatively connected to the microphone and power source, the cover and hearing device housing comprising complementary coupling parts for detachable connection such that the cover is exchangeable, wherein the hearing device housing is kept sealed when the cover is disconnected from it.

One advantage of such a hearing device is that its interior components within its housing being necessary for its function are tightly sealed, such as any of its mechanical and/or electronic functions being kept intact eliminating any jamming of any moving parts and/or interruption of electrical connections/short circuiting due to dirt, moist, water leakage or the like being hindered from entering the interior control "room" of the hearing device.

The present disclosure relates to different aspects including the hearing device described above and in the following, and corresponding hearing devices, binaural hearing devices, larger and/or smaller hearing devices, hearing devices being more or less advanced, e.g. having more or less functionalities, systems, methods, devices, uses and/or product means for helping people with hearing loss and/or any other equipment configured to be used together with and/or in cooperation with hearing devices, each yielding one or more of the benefits and advantages described in connection with the first mentioned aspect, and each having one or more embodiments corresponding to the embodiments described in connection with the first mentioned aspect and/or disclosed in the appended claims.

According to some embodiments, the cover is exchangeable to another type of cover and/or the cover is exchangeable to another cover comprising another type of filter. According to some embodiments, the cover and hearing device housing are configured for creating a space therebetween such that at least a part of the filter can be situated in the space created between cover and hearing device housing. According to some embodiments, at least a part of the filter is provided in a void in the cover. In some embodiments, at least a third of the volume of the filter is provided in a void in the cover and/or at least a third of the weight of the filter is provided in a void in the cover. In some embodiments, the complementary coupling parts comprise snap coupling means configured for detachably connecting the cover and the hearing device housing and/or the complementary coupling parts comprise an exchangeable locking pin configured for detachably connecting the cover and the hearing device housing. According to some embodiments, the complementary coupling parts are configured for engaging an exchangeable locking pin configured for detachably connecting said cover and said hearing device housing by engaging and locking into the complementary coupling parts. According to some embodiments, the cover comprises first complementary coupling parts and/or the hearing device housing comprises second complementary coupling parts. In some embodiments, the cover comprises flanges and/or sides and/or walls configured for fitting to the hearing device housing such that at least a part of the hearing device housing can be enclosed by said flanges and/or sides and/or walls. In some embodiments, the hearing device housing comprises flanges and/or sides and/or walls configured for fitting to the cover such that at least a part of the cover can be enclosed by said flanges/sides/walls. In some embodiments, a sealing is provided for watertight connection between the cover and the hearing device housing. According to some embodiments, the sealing comprises silicone. According to some embodiments, the hearing device housing comprises holes configured for alignment with similar holes provided in the cover such that said cover is able to be detachably locked with said hearing device housing by means of an exchangeable locking pin configured for engaging and locking into the holes and/or the complementary coupling parts comprise holes situated in the flanges/sides/walls, said holes being configured for alignment with similar holes provided in the at least one enclosed part such that said cover is able to be detachably locked with said hearing device housing by enabling for an exchangeable locking pin to engage and lock into the holes.

In some embodiments, the holes and the exchangeable locking pin configured for detachably connecting said cover and said hearing device housing are made with a tolerance, such that the exchangeable locking pin is locked into at least one of the holes by a first friction force adapted to keep the locking pin in place during normal use of the hearing device.

In some embodiments, the complementary coupling parts comprise at least two sets of different coupling parts, one part being a hook-like member and a thereto adapted member such that movement between the cover and hearing device housing is limited when connected by the one part, and a second part complementing the one part such that the cover is detachably fixated when the cover and hearing device housing is connected by both the one part and the second part. According to some embodiments, the cover comprises an user interface configured for controlling the power source of the hearing device for its operation. In some embodiments, the user interface is a button being movably connected to the cover such that the button is operatively connected to the hearing device and its power source when the cover is detachably connected to the hearing device housing. In some embodiments, the button is operatively connected to the hearing device and its power source via at least a part of the sealing of the hearing device housing. In some embodiments, the sealing of the hearing device housing is provided by a silicone membrane.

In another aspect, one or more of the above objects are achieved by means of a tool, as claimed in the associated independent claim, preferred variants thereof being defined in associated dependent claims.

The present disclosure relates to different aspects including the tool described above and in the following, and being configured for use with corresponding hearing devices, binaural hearing devices, larger and/or smaller hearing devices, hearing devices being more or less advanced, e.g. having more or less functionalities, systems, methods, devices, uses and/or product means for helping people with hearing loss and/or any other equipment configured to be used together with and/or in cooperation with hearing devices, each yielding one or more of the benefits and advantages described in connection with the second mentioned aspect, and each having one or more embodiments corresponding to the embodiments described in connection with the second mentioned aspect and/or disclosed in the appended claims.

According to the disclosure at least one of the objects are achieved by a tool for exchanging a cover of a hearing device according to above and/or below comprising a hearing device housing, the tool comprising a handle having a first fixed pin for pushing out a locking pin detachably connecting the cover and the hearing device housing, wherein the handle further comprises a second detachable pin, which can replace the locking pin and thereby detachably mating the cover and the hearing device housing. An advantage of such a tool is that it is easy to access and to hold/grip. Another advantage is that its pins, in particular the detachable one is easy to keep track of and eliminates or at least reduces the risk of loosing it.

Further objects and features will appear from the following description of aspects of the embodiment(s) together with their/its advantages.

In some embodiments, the locking pin detachably connecting the cover and hearing device housing s configured for being locked into the cover and hearing device housing by a first friction force adapted to keep the locking pin in place during normal use of the hearing device. Hence, the locking pin is held in place without any need of additional means for securing it in place, such as snap means, springs, glue or the like. In some embodiments, the locking pin and the second detachably pin are essentially identical in dimension. These pins above and below are both intended to detachably lock the cover and housing detachably together to form the hearing device. Another advantage is that the detachable pin is easy to keep track of and eliminates or at least reduces the risk of loosing it. In some embodiments, the locking pin and the second detachably pin are made of the same material. Hence, they can be manufactured easily in the same machine due to no need of storing and handling different materials, and are easy to recycle in the same way. According to some embodiments, the second detachable pin is attached to the tool handle by a second friction force. An advantage is therefore that the detachable pin is easy to keep track of and eliminates or at least reduces the risk of loosing it without being to difficult/hard to detach from the tool.

According to some embodiments, the second friction force is lower than the first friction force. An advantage is therefore that the detachable pin is easy to detach from the tool while being securely held by the tool until it is to be detached. In some embodiments, the second friction force is greater than the gravitational force acting on the second detachable pin. An advantage is that the detachable pin is easy to detach from the tool while being securely held by the tool until it is to be detached and does not come loose inadvertently, or is at least not prone to come loose inadvertently.

According to some embodiments, the tool handle comprises a holder/bushing for the second detachable pin. An advantage is therefore that the detachable pin is easy to detach from the holder/bushing of the tool while being securely held by the holder/bushing until it is to be detached and does not come loose inadvertently.

According to some embodiments, the holder/bushing of the tool is made of plastic and/or rubber. Hence, advantages are that the grip of the bushing for detachably holding the second pin is easy to maintain and/or optimise.

According to some embodiments, the tool comprises a detachable protection cap configured for covering the second detachable pin when attached to the tool handle. An advantage is therefore that the detachable pin is protected from being detached from the tool as the cap securely covers it until it is to be detached and does not come loose inadvertently, or is at least not prone to come loose inadvertently as the cap must be detached firstly.

According to some embodiments, in the tool, the detachable protection cap is transparent. An advantage is therefore that the detachable pin is easy to see before detaching it from the tool to be able to check if it has come loose inadvertently or not. In some embodiments, the tool is elongated. An advantage of such an elongated tool is that it is easy to hold/grip by a users hand/palm of the users hand. According to some embodiments, in the tool, the first fixed pin is situated with its longitudinal axis in parallel with the longitudinal axis of the tool. According to some embodiments, in the tool, the second detachable pin is situated with its longitudinal axis in parallel with the longitudinal axis of the tool when attached to the tool handle.

According to some embodiments, the tool comprises a detachable protection cap configured for covering the second detachable pin and/or a first fixed pin when attached to the tool handle. Advantages for the second detachable pin are that it does not risk getting lost by falling off the handle if coming loose by mistake and that the user is protected from being stung/pricked by the second detachable pin as it is securely covered by the cap or at least reduces this risk of injury as the cap then must be detached before the second detachable pin is exposed. An advantage for the first fixed pin is that the user is protected from being stung/pricked by the first fixed pin as it is securely covered by the cap or at least reduces this risk of injury as the cap then must be detached before the first fixed pin is exposed (again).

According to some embodiments, the tool comprises a handle having a first fixed pin for pushing out a locking pin detachably connecting the cover and the hearing device housing, wherein the handle further comprises a second detachable pin, which can replace the locking pin and thereby detachably mating cover and hearing device housing, and a detachable protection cap configured for detachably covering the second detachable pin when attached to the tool handle in a first mode, the handle and cap being mutually configured to enable the cap to detachably cover the first fixed pin in a second mode after the first fixed pin has been used for pushing out the locking pin and the second pin is to be detachably assembled. An advantage is that the user is protected from being stung/pricked by the first fixed pin as it is securely covered by the cap or at least reduces this risk of injury as the cap then must be detached firstly before the first fixed pin is exposed again. In some embodiments the first fixed pin is arranged at an end of the tool being opposite the end where the second pin is located before it and the cap is detached. Hence, the cap is moved to the other tool end and detachably assembled over the first fixed pin after the first fixed pin has been used to push out the locking pin wherefore the user when pushing on the handle when assembling the second pin do not risk pricking any part of a hand on the fixed pin when pushing on the handle to introduce/push in the second pin into the hearing device for mating its cover and housing as the cap covers it. The cap may be shaped as a cup with a bottom that covers both the protruding end of the first fixed pin and/or the second detachable pin in the radial direction of the handle and at least the whole protruding and exposed length of the first fixed pin and/or the second detachable pin in the axial direction of the handle or a hollow tube with no closed ends covering at least the whole protruding and exposed length of the first fixed pin in the axial direction of the handle.

In some embodiments, in the tool, the first fixed pin and the second detachable pin are situated at opposite ends of the tool handle. An advantage is therefore that the pins are easy to keep track of and makes the tool more compact and more flexible as no separate or additional storage or track of a loose pin for exchange is required.

Other advantages provided by such a tool is that the hearing device and the tool are separate and easy to use as the tool has a "builtin" detachable locking pin that eliminates or at least reduces the risk of loosing a loosened such small locking pin before replacing an existing locking pin, and that the tool is one and the same separate tool being usable for two functions, i.e. disassembly of the cover from the hearing device housing for cleaning and/or exchange of cover/filters and assembly of the cover to the hearing device housing by providing two "builtin" pins, one fixed pin adapted for pushing out an existing/first locking pin in the hearing device, at one end of the tool, and one second or other or additional detachable locking pin adapted to be pushed by another end of the tool into the hearing device at the same location as the first locking pin for replacing it.

In one more aspect, one or more of the above objects are achieved by means of a system, as claimed in the associated independent claim, preferred variants thereof being defined in associated dependent claims.

The present disclosure relates to different aspects including the system described above and in the following, comprising corresponding hearing devices, binaural hearing devices, larger and/or smaller hearing devices, hearing devices being more or less advanced, e.g. having more or less functionalities, systems, methods, devices, uses and/or product means for helping people with hearing loss and/or any other equipment, such as the tool and/or similar tool, configured to be used together with and/or in cooperation with hearing devices, each yielding one or more of the benefits and advantages described in connection with the third mentioned aspect, and each having one or more embodiments corresponding to the embodiments described in connection with the third mentioned aspect and/or disclosed in appended claims.

One advantage of such a system comprising such a hearing device and tool is that they are easy to use together by having an accessible tool handle that is easy to hold/grip and align with the hearing device.

According to the disclosure at least one of the objects are achieved by a system comprising a hearing device according to above and/or below, and a tool according to above and/or below for exchanging a cover and/or sealing of the hearing device, wherein the tool comprises a handle having a first fixed pin for pushing out a/the locking pin detachably connecting/mating the cover and hearing device housing, wherein the tool handle further comprises a second detachable pin being configured for replacing the locking pin and thereby detachably mating the cover and the hearing device housing.

Further objects and features will appear from the following description.

In some embodiments, the locking pin detachably mating cover and hearing device housing is configured for being locked into the cover and hearing device housing by a first friction force adapted to keep the locking pin in place during normal use of the hearing device. As an advantage, the locking pin is held in place without need of additional means for securing it in place, such as snap means, springs, glue or the like. According to some embodiments, in the system, the second detachable pin is attached to the handle by a second friction force. According to some embodiments, in the system, the second friction force is lower than the first friction force. In some embodiments, in the system, the second friction force is greater than the gravitational force acting on the locking pin. According to some embodiments, in the system, the tool handle comprises a holder/bushing for the second detachable pin. According to some embodiments, in the system, the holder/bushing is made of plastic and/or rubber.

Another advantage of such a hearing device of a system is that it is easy to clean, e.g. by being directly put into water and/or other liquid for cleaning without worrying about any leakage of liquid into the electronics of the hearing device. Yet another advantage of such a hearing device of a system is that it is possible to wear it when showering and/or even bathing and/or swimming and/or even during any downpour without risking its functionality by water leaking into the electronics of the hearing device. A further advantage of such a hearing device of a system comprising such a one is that the hearing device and the tool is easy to use together by having an accessible tool handle that is easy to hold/grip and align.

Still another advantage provided by such a hearing device and/or a system comprising such a one and a separate tool is that the hearing device and the separate tool are easy to use as the tool has a "builtin" detachable locking pin that eliminates or at least reduces the risk of loosing a loosened such small locking pin before replacing an existing locking pin already in the hearing device. One advantage is that such a tool eliminates the need of two separate tools, i.e. one separate tool for detaching the cover and/or the first locking pin and a second tool comprising the second detachable pin and adapted to detachably attach the second detachable pin instead of the first detachable locking pin are not required.

One other advantage by means of such a hearing device and/or a system comprising such a one and a separate tool is that one and the same separate tool is usable for two functions, i.e. disassembly of the cover from the hearing device housing for cleaning and/or exchange of its cover/filters and assembly of the cover to the hearing device housing by providing two "builtin" pins, one fixed pin adapted for pushing out an existing/first locking pin in the hearing device and one second/other/additional detachable locking pin adapted to be pushed into the hearing device at the same location as the first locking pin for replacing it. This is a simplified and more stable/secure way of exchanging cover and/or its filters and/or its sealings of a hearing device by using both hands by a user, one hand holding the hearing device and the other hand holding/moving the tool as desired.

Further objects and features will appear from the following description of aspects/examples/embodiments.

BRIEF DESCRIPTION OF THE DRAWINGS

The embodiments will be described in more detail with reference to the enclosed figures.

In FIG. 6, the detachable cap/lid of the tool is possible to assemble onto the second tool end by being pushed onto it in the direction of the straight dotted arrow I to cover the detachable second locking pin according to an embodiment.

DETAILED DESCRIPTION

Figure 1:
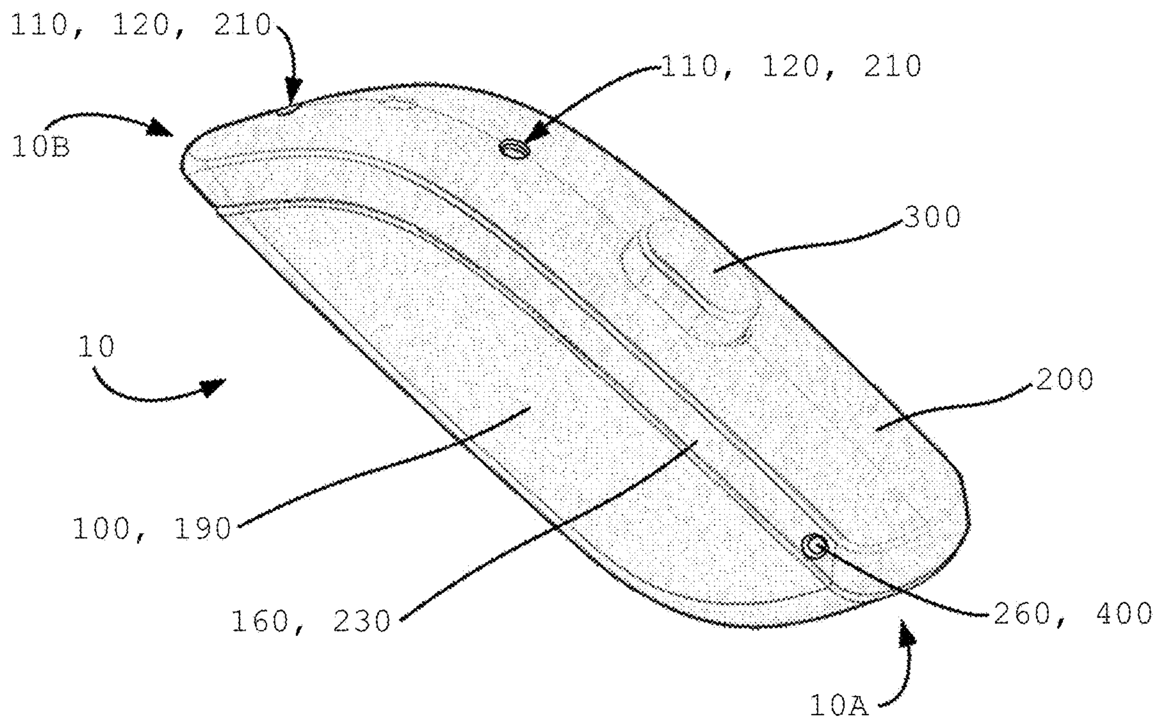
FIG. 1 is a perspective view of a hearing device comprising an enclosure that in turn comprises two parts, one housing and one cover according to an embodiment.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects and/or advantages shown. An aspect or an advantage described in conjunction with a particular embodiment is not necessarily limited to that embodiment and can be practiced in any other embodiments even if not so illustrated, or if not so explicitly described. Throughout, the same reference numerals are used for identical or corresponding parts.

A system 1 comprising at least one hearing device 10 and at least one tool 20 is shown in FIGS. 2-4 and 6-9 as examples/embodiments. The hearing device 10 comprises a housing 100 having at least one sealing 130 and at least one detachable cover 200 having at least one exchangeable audio filter 210. The separate tool 20 with handle is adapted for disconnecting the cover 200 from the housing 100 to enable changing cover and/or audio filter and/or sealing. The exchange is done if the cover is broken and/or too worn and/or need an upgrade and/or change of appearance, e.g. colour and/or shape and/or structure.

The hearing device 10 is shown in FIGS. 1-10 as an example/embodiment. The hearing device 10 comprises the housing 100, at least one microphone 110, at least one audio channel 120 to guide sound to the microphone. The hearing device 10 comprises the at least one sealing 130, a first coupling part 140 and a second coupling part 150 for detachable connection with corresponding or mating parts 240, 250 of cover 200. The hearing device 10 comprises a mating and/or upper and/or top interface or part and/or flange/-s/side/-s/wall/-s 160 at which the cover 200 is removably connected. The hearing device 10 comprises a lower or outer enclosure or part 170 facing away from its upper part 160. The hearing device 10 comprises at least one locking hole 180 for detachable connection and alignment with one or more corresponding hole/-s 260 of cover 200 to enable a locking pin 400, 410 to protrude therethrough. The complementary coupling parts 140, 150, 240, 250 comprise snap coupling means configured for detachably connecting cover 200 and hearing device housing 100. The complementary coupling parts 140, 150, 240, 250 comprise the exchangeable locking pin 400, 410 being configured for detachably connecting cover 200 and hearing device housing 100. The complementary coupling parts 140, 150, 240, 250 are configured for engaging the exchangeable locking pin 400, 410 that in turn is configured for detachably connecting cover 200 and hearing device housing 100 by engaging and locking into the complementary coupling parts. The holes 180 is inner holes of the hearing device 10. The other holes 260 is situated closer to the outer/envelope surface of the hearing device 10, i.e. its cover 200 and/or its housing 100, and/or the other holes 260 are outer through holes and/or have orifices that the locking pin 410 firstly enter before entering the inner through holes 180 when pushed in. The complementary coupling parts 140, 150, 240, 250 are configured to mate as a finger joint, almost intertwined, whereafter the holes 180 on/in first fingers and holes 260 on/in second fingers are aligned with a common through/protruding "line of sight" forming a hollow straight channel or through passage/bore such that the fixed pin 21 and lockings pins 400, 410 are able to be pushed through and into/out of this through passage of holes 180, 260 when a new locking pin 410 is assembled into the holes as a beam and the first locking pin 400 be pushed out of engagement with these holes and the passage when the first locking pin is detached/disassembled, i.e. the new locking pin 400 and the first pin 410 then changes place.

The holes 180 of hearing device housing 100 are configured for alignment with the similar cover holes 260 such that the cover is able to be detachably locked with the hearing device housing by means of the exchangeable locking pin 400, 410 as being configured for engaging and detachably locking into the aligned holes 180, 260 in both cover and housing when finally assembled together. The complementary coupling parts 240, 250 of cover 200 comprise the holes 260 situated in the flanges/sides/walls 230 being configured for alignment with the similar holes 180 of the complementary coupling parts 140, 150 of housing 100 provided in its at least one enclosed part such that the cover is able to be detachably locked with the hearing device housing by enabling the exchangeable locking pin 400, 410 to engage and lock into all the aligned holes 180, 260 by being pushed therethrough. The cover and housing holes 180, 260 and each exchangeable locking pin 400, 410 configured for detachably connecting the cover and the hearing device housing are made with a tolerance, such that each exchangeable locking pin is locked into at least one of the holes by a first friction force $F_1$ (see FIG. 2) adapted to keep the locking pin in place during normal use of the hearing device 10 after assembly. The hearing device 10 comprises at least one power source 190, e.g. a battery, for its operation.

The hearing device 10 comprises and is controlled by at least one controlling unit, e.g. via a knob or button 300 that is accessible from its exterior. The unit for controlling hearing device 10 is operatively connected to other components including the microphones 110 and battery 190, such as electronics/electronic circuits and mechanical devices incl. electrical conduits etc., however, these entities working together for the operation of the hearing device are possible to implement by use of many different types of components and parts being common knowledge for a skilled person and are therefore not explained in detail herein. The cover 200 comprises an user interface, e.g. the knob 300, configured for controlling at least the power source 190 of the hearing device 10 for its operation. The user interface is a button 300 being movably and mechanically connected to cover 200 such that the button is operatively connected to the control electronics of hearing device 10 and its power source 190 when the cover is detachably connected to the hearing device housing 100 but could in other aspects be a touch sensitive button using the same technology as a touch screen. The button 300 is operatively connected to the control electronics of hearing device 10 and at least its power source 190 via at least a part of the sealing 130 of hearing device housing 100.

The sealing 130 of the hearing device 10 is adapted for sealing the interior of the hearing device housing 100 against damp, moist, water or other liquids, dirt and dust for protection of control circuits, including control unit 300 and power source 190 and all other associated components necessary for operation of the hearing device 10. The cover 200 and hearing device housing 100 comprise the complementary coupling parts 140, 150, 240, 250 for detachable connection, such that the cover is exchangeable while keeping the hearing device housing 100 tightly sealed/watertight, when the cover is disconnected from it, but also when the cover is connected to the housing. The sealing 130 comprises silicone and/or is at least partly made of silicone and/or is provided by a silicone membrane.

Each microphone 110 works as an input transducer and the functionality of hearing device 10 is explained shortly here as its function is common knowledge for a skilled person. Each microphone 110 receives sound through an audio channel 120 and a filter 210 and outputs an analogue audio signal based on the acoustic sound signal arriving at the microphone when the hearing device 10 is operating. An analogue-to-digital converter converts the analogue audio signal into a corresponding digital audio signal for digital signal processing in the hearing circuit, such as a hearing loss processor that is configured to compensate a hearing loss of a user of the hearing device. Preferably, the hearing loss processor comprises a dynamic range compressor well-known in the art for compensation of frequency dependent loss of dynamic range of the user often termed recruitment in the art. In this way, the hearing device 10 may be configured to restore loudness, such that loudness of the hearing loss compensated signal as perceived by the user wearing the hearing device 10 substantially matches the loudness of the acoustic sound signal arriving at the microphone 110 as it would have been perceived by a listener with normal hearing. Accordingly, the hearing loss processor outputs a digital hearing loss compensated audio signal. A digital-to-analogue converter then converts the digital hearing loss compensated audio signal into a corresponding analogue hearing loss compensated audio signal. An output transducer in the form of a receiver converts the analogue hearing loss compensated audio signal into a corresponding acoustic signal for transmission via a loudspeaker or the like towards an eardrum of the user, whereby the user hears the sound originally arriving at the microphone, however, compensated for the user's individual hearing loss. The hearing loss processor is operatively coupled to the control unit and/or master unit and/or the knob 300 of hearing device 10 in a way being common knowledge to a skilled person, wherefore this functionality of the hearing device is not further explained herein.

Figure 3:
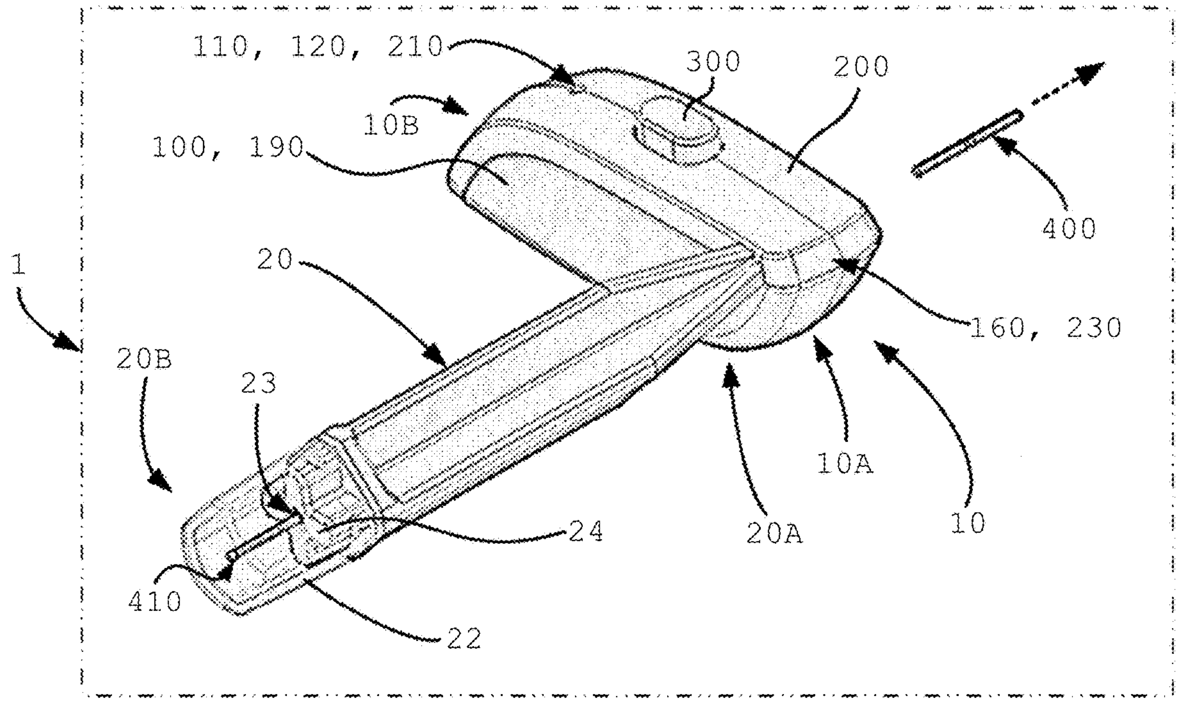
FIG. 3 is a perspective view of the system of FIG. 2 shown in a second stage, where the tool has been aligned in a certain position with a first end comprising a fixed protruding push pin facing the hearing device and moved in the direction of the straight dotted arrow of FIG. 2 such that its push pin protrudes into and through the hearing device to engage a first locking pin and pushes this first locking pin in the hearing device out of the hearing device in the direction of the straight dotted arrow of FIG. 3 to enable separating the cover from the housing part according to an embodiment.
Figure 4:
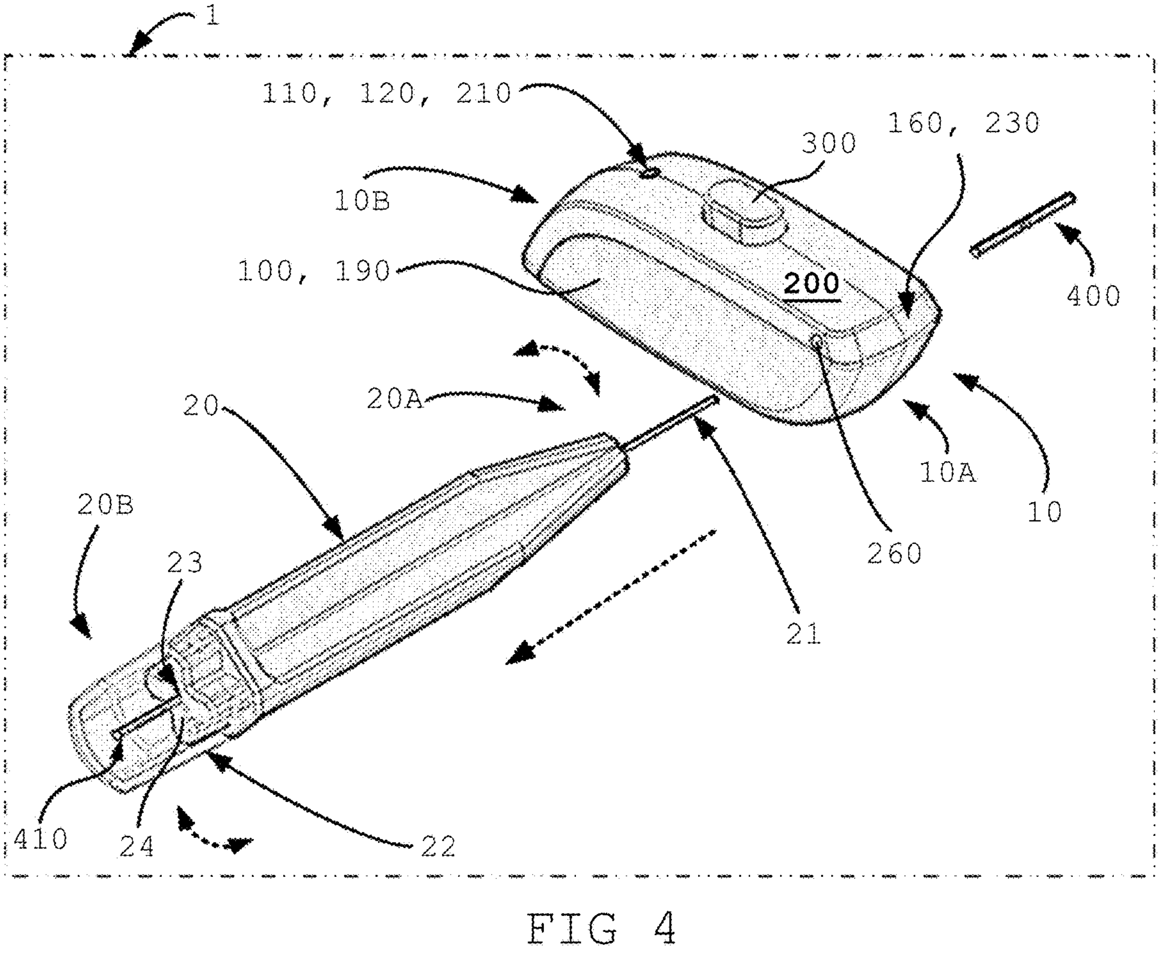
FIG. 4 is a perspective view of the system of FIGS. 2 and 3 shown in a third stage, where the tool has been moved in an opposite direction (straight dotted arrow of FIG. 4) compared to the direction of the straight dotted arrow of FIG. 2 to pull its push pin out of the hearing device according to an embodiment.
Figure 5:
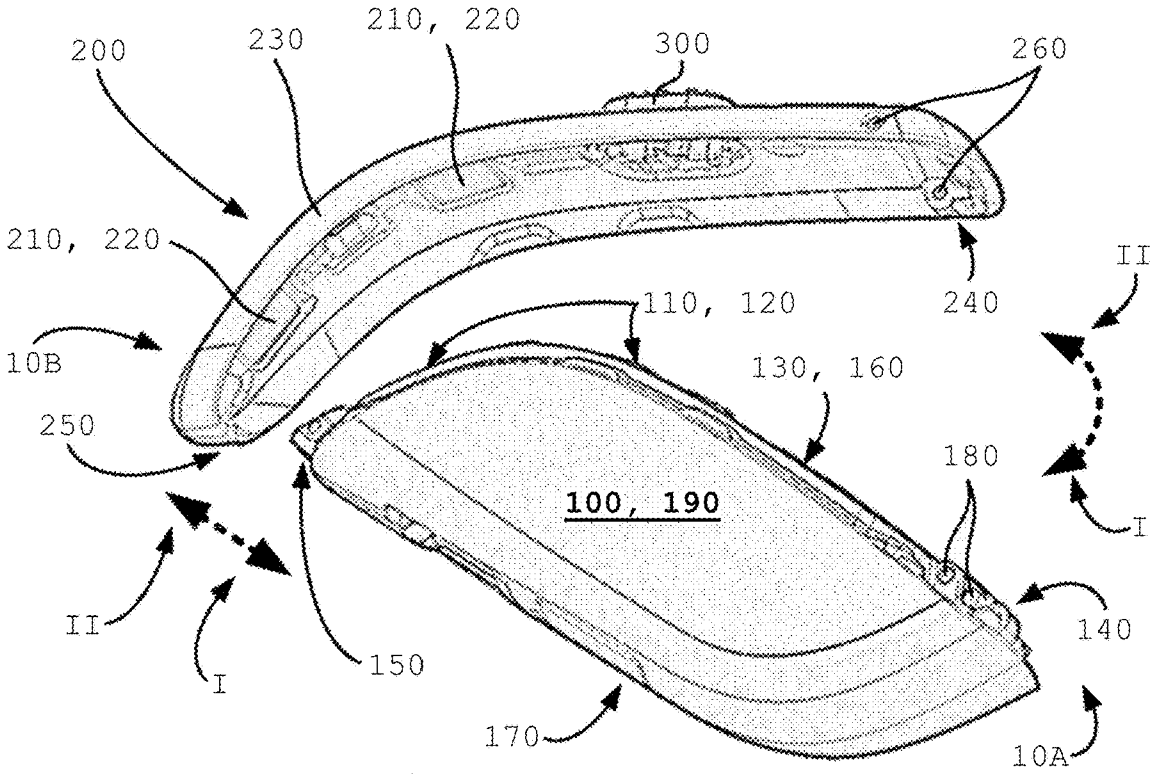
FIG. 5 is a perspective view showing the hearing device of FIGS. 1 to 4 in disassembled state, i.e. its parts forming its enclosure are being assembled together after being detached as shown in FIGS. 2 to 4 and symbolised by the straight/bent/curved dotted arrow heads I or are/are being disconnected as symbolised by the straight/bent/curved dotted arrow heads II according to an embodiment.

The separate tool 20 is shown in FIGS. 2-4 and 6-9 as examples/embodiments. The tool 20 is adapted for easy and quick exchange of a cover 200 with one or more filters 210 (audio filters or the like). This is enabled in that the cover 200 is detachable from the hearing device housing 100, which also enables changing a sealing 130 if desired, after the cover is detached from the housing as this gives access to sealing 130 and/or filters 210. The cover 200 comprises at least one void or cavity 220 for receiving and/or holding at least a part of or the whole filter 210. The cover 200 comprises at least one flange or side or wall 230. The cover 200 comprises at least one first coupling member 240 for detachable connection with the first coupling part 140 of housing 100 and at least one second coupling member 250 for detachable connection with the second coupling part 150 of housing 100. The cover 200 comprises at least one locking hole 260 for detachable connection and alignment with one or more of the corresponding holes 180 of housing 100 by means of the locking pin 400, 410 protruding therethrough. The cover 200 comprises the flanges and/or sides and/or walls 230 configured for fitting to the hearing device housing 100 such that at least a part of the flange/wall/side 160 of the hearing device housing can be enclosed by the flanges and/or sides and/or walls of cover 200 or hearing device housing 100 comprises one or more flanges and/or sides and/or walls 160 configured for fitting to cover 200 such that at least a part of cover/cover flange/side/wall 230 can be enclosed by a flange/side/wall 160 of housing 100. In one aspect, the complementary hearing device coupling parts 140, 150, 240, 250 comprise at least two sets of different coupling parts, one part being a hook-like member 250 (see FIG. 5) and a thereto adapted member 150 so that movement between the cover 200 and the hearing device housing 100 is limited when connected by the one part, and a second part 140, 240 complementing the one part 150, 250 such that the cover is detachably fixated when cover and hearing device housing is connected by both the one part and the second part. The second part of the hearing device 10 comprising the coupling parts 140 and 240 is located at a first end 10A of the hearing device as seen in FIG. 5. The one part of the hearing device 10 comprising the coupling parts/members 150 and 250 is located at a second end 10B of the hearing device as seen in FIG. 5. The complementary member 250 of the hearing device 10 is introduced and/or hooked over the complementary adapted member 150 in a straight and/or somewhat rotary movement as seen in FIG. 5 at a second end 10B of the hearing device. The first hearing device end 10A comprises a first coupling part 140 placed at/on a part of the hearing device housing 100. The second hearing device end 10B comprises a second coupling part 150 placed at/on a part of the hearing device housing 100. The first hearing device end 10A comprises a first coupling member 240 placed at/on the hearing device housing cover 200. The second hearing device end 10B comprises a second coupling member 250 at/on the hearing device housing cover 200. The first coupling part 140 is configured for being part of a finger joint of the hearing device 10. The second coupling part 150 is in some aspects configured for being part of a finger joint of the hearing device 10. The first coupling member 240 is configured for being part of a finger joint of the hearing device 10. The second coupling member 250 is in some aspects configured for being part of a finger joint of the hearing device 10. The complementary member 250 is introduced/hooked over the complementary adapted member 150 at/on the second hearing device end 10B just before the first coupling parts 140 and 240 are joined in a finger joint at/on the first hearing device end 10A when the cover 200 is assembled onto the hearing device housing 100 to make up the whole hearing device 10 as seen in FIG. 5. When detaching the cover 200 from the housing 100, this is done in a reverse or opposite order. The hearing device 10 comprises in some aspects one or more finger joints as disclosed, e.g. one finger joint at its first end 10A or one finger joint at its second end 10B. The hearing device 10 comprises in some aspects at least two finger joints as disclosed, e.g. one finger joint at its first end 10A and one finger joint at its second end 10B.

In some aspects, the hearing device housing 100 or the cover 200 could optionally have a guiding pin or the like (not shown) protruding out of the housing or cover in a direction substantially perpendicular or perpendicular to the longitudinal directions of the locking pins 400, 410 and being configured for introduction/receivment of a hole or receptacle (not shown) in the opposite entity, i.e. the cover 200 if the pin is placed in and protrudes out of the housing 100 or the housing 100 if the pin is placed in and protrudes out of the cover 200. In some aspects, the housing 100 and/or cover 200 could each comprise more than one guiding pin and/or receptacle, e.g. a pair of pins/receptacles each.

The cover 200 is exchangeable to another type of cover and/or another cover comprising another type of filter 210 and/or at least two different types of filter as shown in FIG. 5 or more. Each filter 210 protects the interior of hearing device 10 from dirt or at least reduces the amount of dirt entering an audio channel 120. Cover 200 and hearing device housing 100 are configured for creating a space therebetween such that at least a part of the filter 210 can be situated in the space created between cover and hearing device housing. In one aspect, at least a third of the volume of a filter 210 is provided in the associated cover void 220 and/or at least a third of the weight of a filter is provided in the cover void.

The tool 20 comprises an easy grippable handle having a first fixed pin 21 for pushing out a first locking pin 400 detachably connecting cover 200 and hearing device housing 100 as the hearing device 10. The tool handle comprises the second detachable locking pin 410 being configured for replacing the first locking pin 400 and thereby once again detachably mating cover and hearing device housing after first disassembling these entities by pushing out the first locking pin and then pushing in the second locking pin 410 in the same holes 180, 260 as the first locking pin 400. The first locking pin 400 and second detachable locking pin 410 are essentially identical or identical in dimension (within tolerances of this technical area). In one aspect, the first locking pin 400 and the second detachably locking pin 410 are made of the same material.

Figure 2:
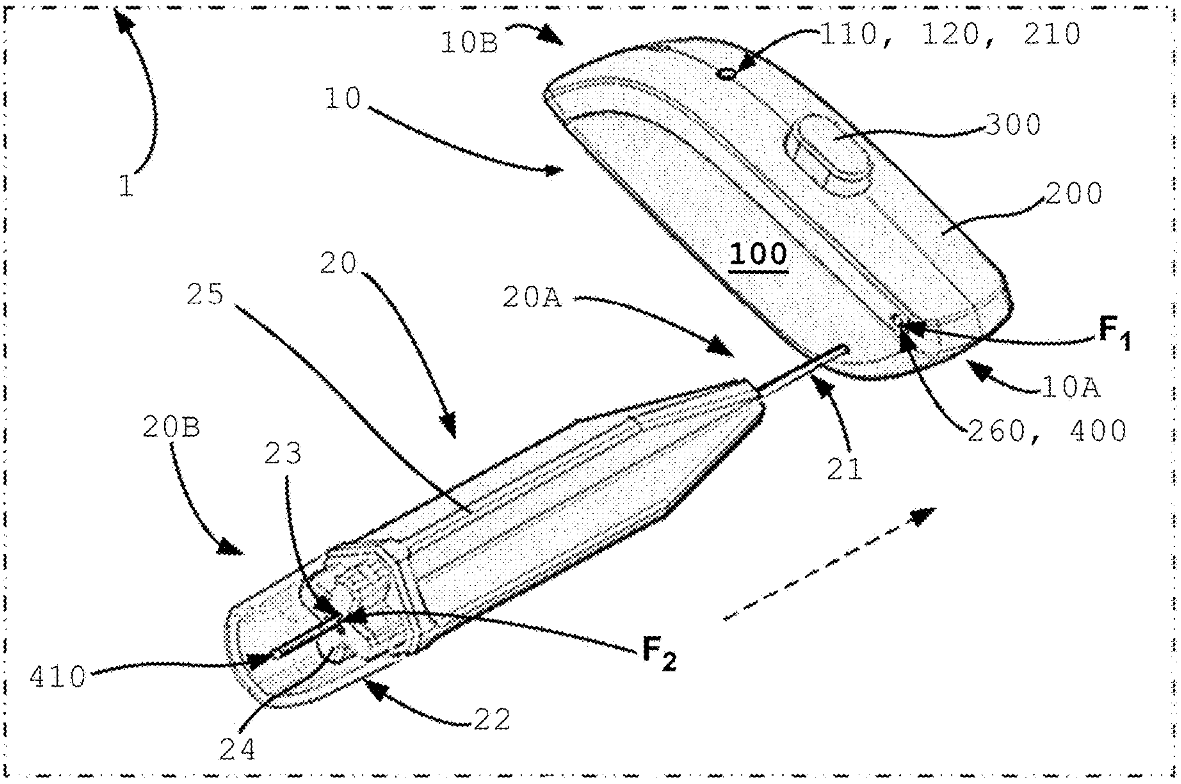
FIG. 2 is a perspective view of a system shown in a first stage, the system comprising a hearing device according to FIG. 1 and a separate tool, with a first and a second end, being adapted for both separating the two-part hearing device into its housing part and cover and to assemble the two-parts of the hearing device, i.e. its housing part and cover, into the whole hearing device again, which first stage shows the hearing device in an assembled state before the hearing device is disassembled according to an embodiment.
Figure 8:
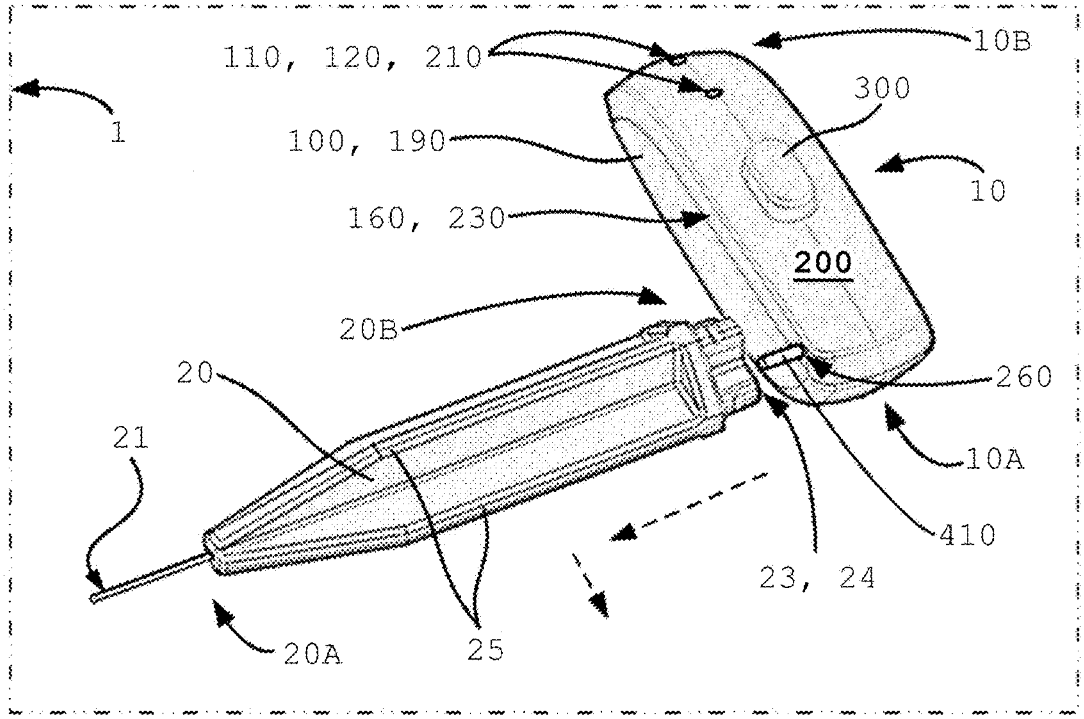
FIG. 8 is a perspective view of the system of FIGS. 2, 3, 4, 6 and 7 shown in a sixth stage, where the tool has been moved from the position in FIG. 7 away from the hearing device in the opposite direction, i.e. according to the straight dotted arrow with single arrow head of FIG. 8 extending along the length of the tool, such that its second locking pin is released from the tool and protrudes partly out of the hearing device to prepare/initiate final assembly of the cover and housing part of the hearing device according to an embodiment.
Figure 9:
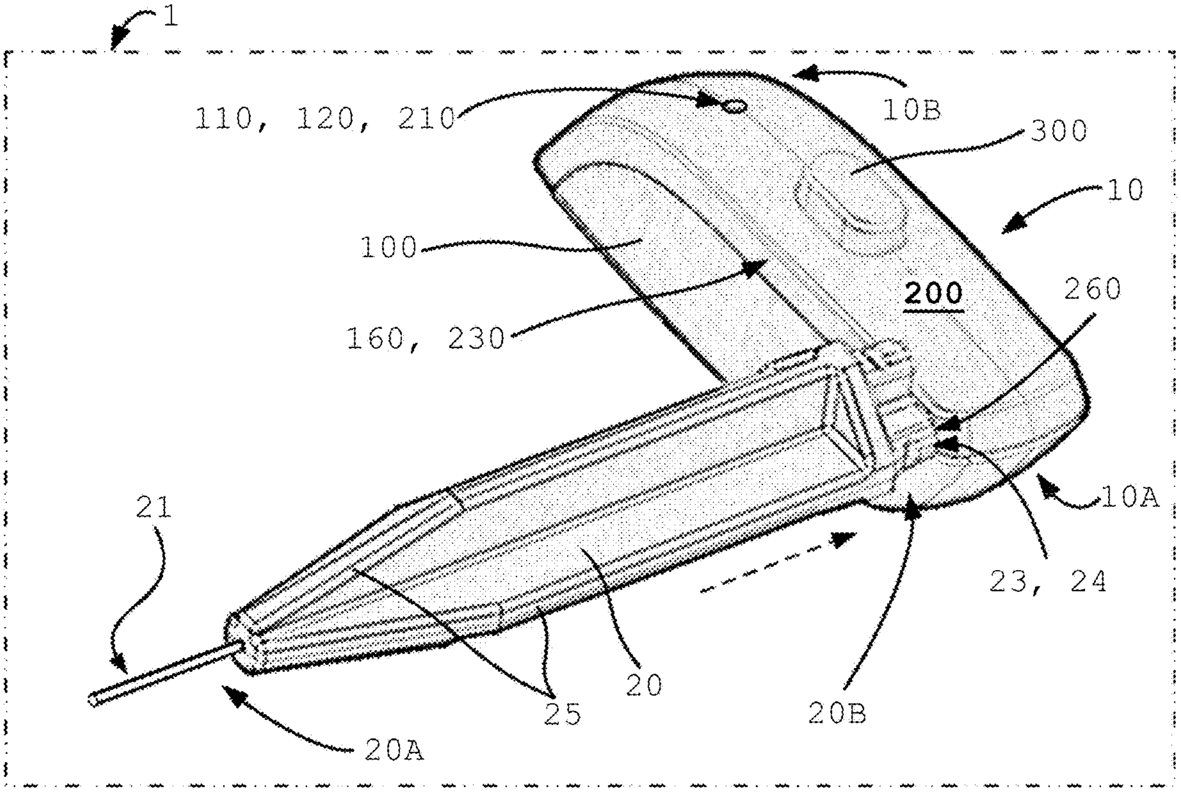
FIG. 9 is a perspective view of the system of FIGS. 2, 3, 4, 6, 7 and 8 shown in a seventh stage, where the tool has been moved with its second end firstly along the hearing device in a direction substantially perpendicular or perpendicular to the longitudinal extension of the tool as visualised with the left straight dotted arrow of FIG. 8 and then in the direction of the straight dotted arrow of FIG. 9 being the opposite direction compared to the right straight dotted arrow in FIG. 8 towards and again into contact/engagement with the hearing device and the exposed end of the partly protruding second locking pin of FIG. 8 of its second end such that the second locking pin is pushed further into the hearing device until it is substantially flush or flush or even somewhat retracted below the outer surface of the hearing device to finally engage and assemble the cover and housing part of the hearing device detachably together according to an embodiment.
Figure 10:
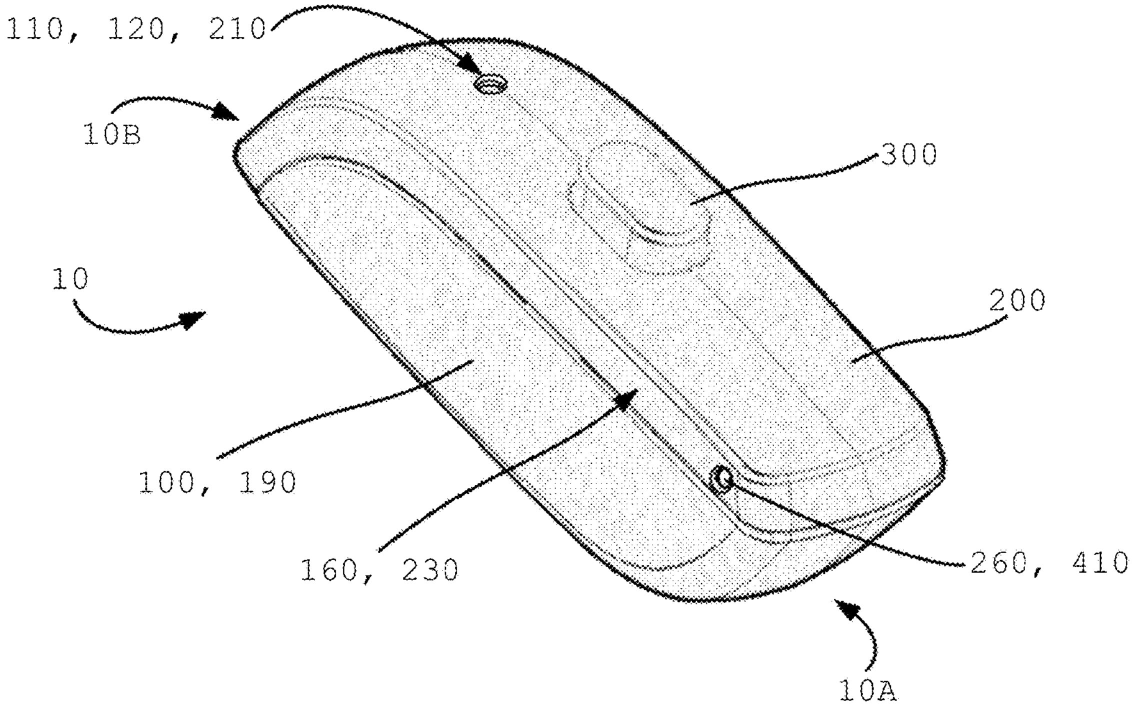
FIG. 10 is a perspective view of the hearing device according to FIGS. 1 to 9 with a new locking pin that also is replaceable if required later on according to an embodiment.

When the separate tool 20 and the hearing device 10 is in use, they together form a system 1 enabling easy exchange of the hearing device cover 200 (including one or more filters 210 and/or sealings 130). In one aspect of the tool 20 and/or system 1, the second detachable locking pin 410 is attached to the tool 20, i.e. at its second end 20B of its handle by a second friction force $F_2$. In one aspect, the second friction force $F_2$ is lower than the first friction force $F_1$. In one aspect, the second friction force $F_2$ is greater than the gravitational force acting on the detachable locking pin 410. The second detachable locking pin 410 is held by a holder and/or receiver 23 of the handle of the tool 20. The pushing of the second locking pin 410 into the same holes 180, 260 as the first locking pin 400 is enabled by engaging an interface or surface 24 of the second tool end 20B against the end of a locking pin 410 as shown in FIGS. 2, 8 and 9 that pushes the locking pin further into a final assembly position shown in FIG. 10. The surface 24 is flat and extends in a plane being perpendicular to the longitudinal axes of the tool 20 and its pins 21, 410. The surface 24 is shaped as a cross/plus sign as seen in FIGS. 2-4 but could in other aspects be circular or oval or shaped as letter O or have a triangular shape or another shape as long as this surface is able to abut/contact the end of the second locking pin 410 that protrudes out of the hole 260 of cover 200 of hearing device 10 as shown in FIG. 8, i.e. the contacting area between surface 24 and the protruding end of the second locking pin 410 are separated from the centre area of the holder 23, i.e. not coinciding with the centre of the holder 23 as shown in FIGS. 2-4. The holder 23 of the tool handle is in the form of a hole and/or bushing 23 for the second detachable locking pin 410. The bushing 23 is made of plastic and/or rubber. The bushing 23 comprises a centre cavity or the centre hole in which the second detachable locking pin 410 is introduced and received and detachably held after introduction, which cavity/hole and pin 410 is adapted in size and/or shape and/or surface roughness and/or materials and/or dimensions such that the removable holding and/or attachment of the pin 410 by means of the second friction force $F_2$ is achieved. Examples of the shape of the centre cavity or hole of the holder 23 achieving the second friction force $F_2$ are cross-sections or openings with a shape corresponding to the surface 24 or with a circular cross-section or being shaped as a three-leaf clover or trefoil as seen in FIG. 2 when viewing tool 20 from its second end 20B in the longitudinal direction of the tool.

The tool 20 comprises at least one outer rib 25 extending radially along the tool length, see FIGS. 2-4 and 6-9, for increased/better/improved grip when held/moved to push against and pull away from the pins 400, 410. As a preferred example, the tool 20 comprises four ribs 25 distributed symmetrically around the envelope surface of the tool 20. The four ribs 25 are configured to secure holding of and simplify/improve making of the tool 20, in particular if plastic moulded, as the ribs transcend at their ends towards the first tool end 20A with a decreasing height radially relative the longitudinal axis of the tool towards the first pin 21. The four ribs 25 are configured to secure holding of and simplify/improve making the tool 20, in particular if plastic moulded, as these ribs transcend at their ends towards the second tool end 20B and the holder 23 corresponding ribs that abruptly ends in/at the plane of the surface 24.

Figure 6:
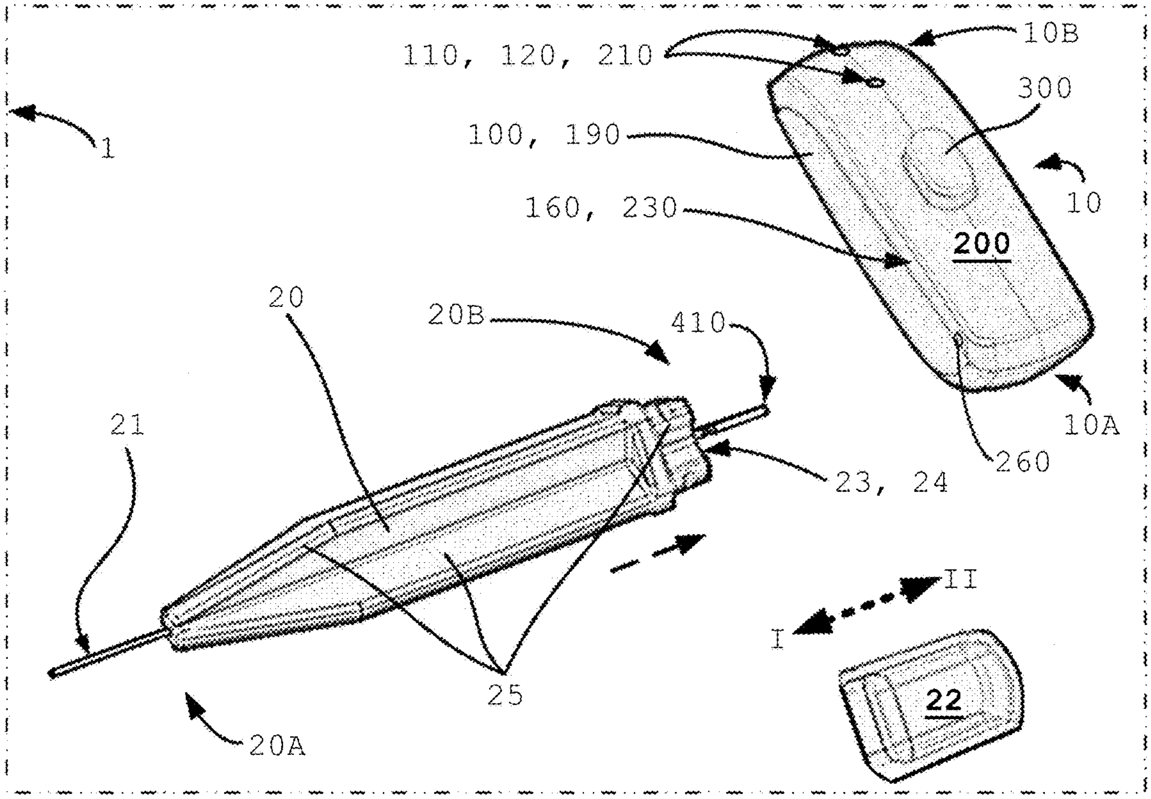
FIG. 6 is a perspective view of the system of FIGS. 2, 3 and 4 shown in a fourth stage, where the tool has been turned 180 in the direction of the bent/curved dotted arrows of FIG. 4, so that its other/second end comprising a detachable second locking pin faces the hearing device, and a detachable cap/lid of this other/second end of the tool has been detached/removed by being withdrawn from the second tool end in the direction of the straight dotted arrow II to reveal/expose the detachable second locking pin and then is aligned in the corresponding position as for the push pin of FIGS. 2 and 4, such that the second locking pin is able to be pushed into the hearing device at the same location as the first locking pin by moving the tool towards the hearing device in the direction of the other straight dotted arrow with one arrow head of FIG. 6 according to an embodiment.
Figure 7:
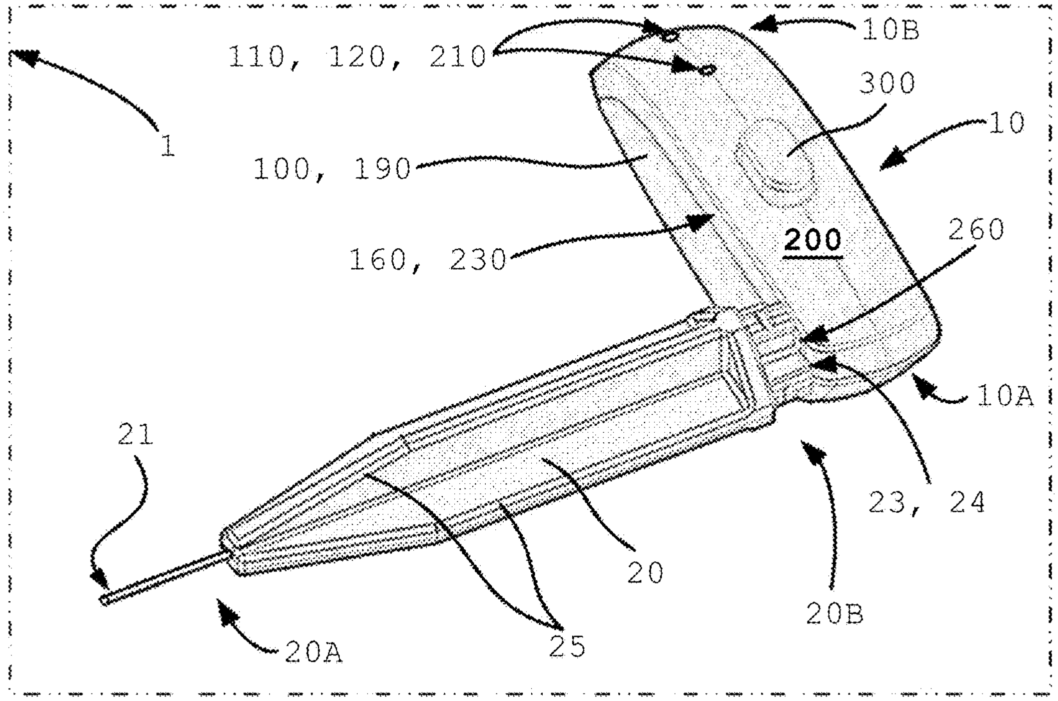
FIG. 7 is a perspective view of the system of FIGS. 2, 3, 4 and 6 shown in a fifth stage, where the tool has been moved with its second locking pin towards and into contact/engagement with the hearing device in the direction of the straight dotted arrow with single arrow head of FIG. 6 such that its second locking pin protrudes into the hearing device to partly engage it to prepare/initiate final assembly of the cover and housing part of the hearing device according to an embodiment.

In FIGS. 2-4, the tool 20 is shown with one detachable protection cap 22 assembled and configured for covering the second detachable pin 410 and/or the first fixed pin 21 when attached to the tool handle. In FIG. 6, the tool 20 is shown with its detachable protection cap 22 removed from its handle to reveal/expose and give access to the second detachable pin 410 for enabling its introduction into the hearing device 10 but could have at least two such caps 22. The detachable protection cap 22 is shown transparent but could in other aspects be opaque and/or partly transparent. In FIGS. 2-4, 6, and 7-9, the tool 20 is shown elongated with certain proportions, but could in other aspects have other proportions, e.g. be thicker or thinner for better/optimised grip and/or longer/shorter depending on the size of hearing device 10 and/or have a shorter or longer fixed pin 21 depending on the width of the hearing device that is necessary to protrude through when pushing out a locking pin 400, 410. The first fixed pin 21 is situated with its longitudinal axis in parallel with the longitudinal axis of tool 20, but could be somewhat inclined in relation thereto or even be partly bent/curved, but then would at least a sufficient length of the pin 21 have to be straight.

The second detachable pin 410 is situated with its longitudinal axis in parallel with the longitudinal axis of the tool 20 when attached to the tool handle but could also extend at least somewhat inclined in relation to the longitudinal axis of the tool 20 or even extend substantially perpendicular or perpendicular to the longitudinal axis of the tool 20 requiring another orientation and movement of the tool 20 when pushing in and out the first and second pins 400, 410. The present layout/structure/design of the hearing device 10 and location of its holes 180, 260 and the tool 20 give a stability and repeatability when aligning and moving these entities in relation to each other. The first fixed pin 21 and the second detachable pin 410 are situated at opposite ends 20A, 20B of the tool 20, i.e. its handle to provide a better and easier targeting of the holes 180, 260.

The hearing device 10 optionally includes a wireless communication unit, e.g. in the form of a radio chip connected to an antenna and configured to communicate wirelessly with other devices, e.g. in a hearing loss aiding network as is well-known in the art.

In one aspect, a system 1 comprises the hearing device 10 and a separate tool 20 with a handle. The tool 20 is adapted for enabling easy and quick exchange of the cover 200 of the hearing device 10 and thereby one or more filters 210 of the cover. Another aspect also relates to the tool itself. In one aspect, the finger or gear like joint achieved by the complementary coupling parts 140, 150, 240, 250 and the holes 180, 260 and the pins 400, 410 are applicable in other devices than hearing devices 10 where detachment of one part from another part, in an easy and reliable way, is required, e.g. when detaching or attaching a battery lid.

In some aspects, an item no 1 concerns a hearing device 10 comprising a hearing device housing 100. The hearing device housing 100 comprises at least one microphone 110 and a cover 200. The cover 200 comprises at least one filter 210 for covering an audio channel 120 for channeling sound between the surroundings and the at least one microphone arranged in the hearing device housing. The hearing device housing 100 comprises a control unit 300 and a power source 190. The hearing device housing 100 comprises a sealing 130 for sealing the interior of the hearing device housing against damp, moist, dirt and dust for protection of the control unit and the power source. The control unit 300 being operatively connected to the microphone 110 and the power source 190. The cover 200 and the hearing device housing 100 comprises complementary coupling parts 140, 150, 240, 250 for detachable connection such that said cover is exchangeable, wherein the hearing device housing 100 is kept sealed when the cover is disconnected from it. In some aspects, an item no 2 concerns a hearing device 10 according to item no 1, wherein the cover 200 is exchangeable to another type of cover. In some aspects, an item no 3 concerns a hearing device 10 according to item no 1 or item no 2, wherein the cover 200 is exchangeable to another cover comprising another type of filter 210. In some aspects, an item no 4 concerns a hearing device 10 according to item no 1 or item no 2, wherein the cover 200 and hearing device housing 100 are configured for creating a space therebetween such that at least a part of the filter 210 can be situated in the space created between cover and hearing device housing. In some aspects, an item no 5 concerns a hearing device 10 according to any preceding item, wherein at least a part of the filter 210 is provided in a void 220 in the cover 200. In some aspects, an item no 6 concerns a hearing device 10 according to item no 5, wherein at least a third of the volume of the filter 210 is provided in a void 220 in the cover 200. In some aspects, an item no 7 concerns a hearing device 10 according to item no 5 or no 6, wherein at least a third of the weight of the filter 210 is provided in a void 220 in the cover 200. In some aspects, an item no 8 concerns a hearing device 10 according to any preceding item, wherein the complementary coupling parts 140, 150, 240, 250 comprise snap coupling means configured for detachably connecting the cover 200 and the hearing device housing 100. In some aspects, an item no 9 concerns a hearing device 10 according to any preceding item, wherein the complementary coupling parts 140, 150, 240, 250 comprise an exchangeable locking pin 400, 410 configured for detachably connecting the cover 200 and the hearing device housing 100. In some aspects, an item no 10 concerns a hearing device 10 according to any preceding item, wherein the complementary coupling parts 140, 150, 240, 250 are configured for engaging an exchangeable locking pin 400, 410 configured for detachably connecting the cover 200 and the hearing device housing 100 by engaging and locking into the complementary coupling parts. In some aspects, an item no 11 concerns a hearing device 10 according to any preceding item, wherein the cover 200 comprises first complementary coupling parts 240, 250. In some aspects, an item no 12 concerns a hearing device 10 according to any preceding item, wherein the hearing device housing 100 comprises second complementary coupling parts 140, 150. In some aspects, an item no 13 concerns a hearing device 10 according to any preceding item, wherein the cover 200 comprises flanges and/or sides and/or walls 230 configured for fitting to the hearing device housing 100 such that at least a part 160 of the hearing device housing can be enclosed by said flanges and/or sides and/or walls. In some aspects, an item no 14 concerns a hearing device 10 according to any of items no 1 to 12, wherein the hearing device housing 100 comprises flanges and/or sides and/or walls 160 configured for fitting to the cover 200 such that at least a part 230 of the cover can be enclosed by said flanges and/or sides and/or walls. In some aspects, an item no 15 concerns a hearing device 10 according to any preceding item, wherein a sealing 130 is provided for watertight connection between the cover 200 and the hearing device housing 100. In some aspects, an item no 16 concerns a hearing device 10 according to item no 15, wherein the sealing 130 comprises silicone. In some aspects, an item no 17 concerns a hearing device 10 according to item no 11 or no 12, wherein the hearing device housing 100 comprises holes 180 being configured for alignment with similar holes 260 provided in the cover 200 such that said cover is able to be detachably locked with said hearing device housing by means of an exchangeable locking pin 400, 410 configured for engaging and locking into the holes 180, 260. In some aspects, an item no 18 concerns a hearing device 10 according to item no 13 or no 14, wherein the complementary coupling parts 140, 150, 240, 250 comprise holes 260 situated in the flanges and/or sides and/or walls 160, 230, said holes being configured for alignment with similar holes 180 provided in the at least one enclosed part such that said cover 200 is able to be detachably locked with said hearing device housing 100 by enabling for an exchangeable locking pin 400, 410 to engage and lock into the holes 180, 260. In some aspects, an item no 19 concerns a hearing device 10 according to item no 17 or no 18, wherein the holes 180, 260 and the exchangeable locking pin 400, 410 configured for detachably connecting said cover 200 and said hearing device housing 100 are made with a tolerance, such that the exchangeable locking pin is locked into at least one of the holes by a first friction force $F_1$ adapted to keep the locking pin in place during normal use of the hearing device 10. In some aspects, an item no 20 concerns a hearing device 10 according to any of preceding items, wherein the complementary coupling parts 140, 150, 240, 250 comprise at least two sets of different coupling parts, one part being a hook-like member 250 and a thereto adapted member 150 such that movement between the cover 200 and hearing device housing 100 is limited when connected by the one part, and a second part 140, 240 complementing the one part 150, 250 such that the cover is detachably fixated when the cover and hearing device housing is connected by both the one part and the second part. In some aspects, an item no 21 concerns a hearing device 10 according to any of preceding items, wherein the cover 200 comprises an user interface 300 configured for controlling power source 190 of the hearing device for its operation. In some aspects, an item no 22 concerns a hearing device 10 according to item no 21, wherein the user interface is a button 300 being movably connected to the cover 200 such that the button is operatively connected to the hearing device 10 and its power source 190 when the cover is detachably connected to the hearing device housing 100. In some aspects, an item no 23 concerns a hearing device 10 according to item no 22, wherein the button 300 is operatively connected to the hearing device 10 and its power source 190 via at least a part of the sealing 130 of the hearing device housing 100. In some aspects, an item no 24 concerns a hearing device 10 according to any of the preceding items, wherein the sealing 130 of the hearing device housing 100 is provided by a silicone membrane. In some aspects, an item no. 25 concerns a tool 20 for exchanging a cover 200 of a hearing device 10 comprising a hearing device housing 100. The tool 20 comprises a handle having a first fixed pin 21 for pushing out a locking pin 400. The locking pin 400 detachably connects the cover and hearing device housing. The handle further comprises a second detachable pin 410, which can replace the locking pin 400, thereby detachably mating the cover and hearing device housing. In some aspects, an item no 26 concerns a tool 20 for exchanging a cover 200 of hearing device 10 according to item no 25, wherein the locking pin 400 and the second detachably pin 410 are essentially identical in dimension. In some aspects, an item no 27 concerns a tool 20 changing a cover 200 of a hearing device 10 according to item no 25 or no 26, wherein locking pin 400 and second detachably pin 410 are made of the same material. In some aspects, an item no. 28 concerns a system 1 comprising a hearing device 10 according to any of items no. 9 to 24 and a tool 20 for exchanging a cover 200 of the hearing device. The tool 20 comprising a handle having a first fixed pin 21 for pushing out the locking pin 400. The locking pin 400 detachably mating the cover and hearing device housing 100. The tool handle further comprises a second detachable pin 410 being configured for replacing the locking pin and thereby detachably mating cover and hearing device housing. In some aspects, an item no 29 concerns a system 1 comprising a hearing device 10 according to item no 28 when dependent on item no 20 or according to any of items no 21 to 24 when dependent on item no. 20, wherein said second detachable pin 410 is attached to said tool handle by a second friction force $F_2$. In some aspects, an item no 30 concerns a system 1 according to item no 29, wherein the second friction force $F_2$ is lower than the first friction force $F_1$. In some aspects, an item no. 31 concerns a system 1 according to item no 29 or no 30, wherein the second friction force $F_2$ is greater than the gravitational force acting on the locking pin 410. In some aspects, an item no. 32 concerns a system 1 according to any of items no 28 to 31, wherein the handle of the tool 20 comprises a holder and/or bushing 23 for the second detachable pin 410. In some aspects, an item no. 33 concerns a system 1 according to item no. 32, wherein the bushing 23 is made of plastic and/or rubber. In some aspects, an item no 34 concerns a tool 20 according to any of items no 25 to 27, wherein the second detachable pin 410 is attached to the tool handle by a second friction force $F_2$. In some aspects, an item no. 35 concerns a tool 20 according to item no. 34, wherein the second friction force $F_2$ is lower than the first friction force $F_1$. In some aspects, an item no 36 concerns a tool 20 according to item no 35, wherein the second friction force $F_2$ is greater than the gravitational force acting on the second detachable pin 410. In some aspects, an item no 37 concerns a tool 20 according to any of items no 34 to 36, wherein the tool handle comprises a holder/bushing 23 for the second detachable pin 410. In some aspects, an item no. 38 concerns a tool 20 according to any of items no 34 to 37, wherein the tool 20 comprises a detachable protection cap 22 configured for covering the second detachable pin 410 and/or the first fixed pin 21 when attached to the tool handle. In some aspects, an item no. 39 concerns a tool 20 according to item no. 38, wherein the detachable protection cap 22 is transparent. In some aspects, an item no. 40 concerns a tool 20 according to any of items no. 34 to no. 39, wherein the tool 20 is elongated. In some aspects, an item no. 41 concerns a tool 20 according to any of items no. 34 to no. 40, wherein the first fixed pin 21 is situated with its longitudinal axis in parallel with the longitudinal axis of the tool 20. In some aspects, an item no. 42 concerns a tool 20 according to any of items no. 34 to no. 41, wherein the second detachable pin 410 is situated with its longitudinal axis in parallel with the longitudinal axis of the tool 20 when attached to the tool handle. In some aspects, an item no. 43 concerns a tool 20 according to any of items no. 34 to no. 42, wherein the first fixed pin 21 and the second detachable pin 410 are situated at opposite ends 20A, 20B of the tool handle. A system may be provided, which comprises a hearing device 10 with improved sealing and a tool 20 providing easy exchange of one or more covers 200 and/or one or more filters 210 and/or one or more sealings 130 in/on the hearing device, and the tool itself.

NOMENCLATURE

1: Hearing device system comprising a hearing device 10 with exchangeable audio filter 210 and a separate tool/handle 20 for exchanging said audio filter/-s.

10: Hearing device

20: Tool/Handle for exchanging locking pins. 20A: First tool/handle end. 20B: Second tool/handle end. 21: Fixed push pin on tool/handle. 22: Detachable cap/lid on tool/handle.

23: Holder/Receiver for locking pin. 24: Interface/Surface for engaging/pushing locking pin.

25: Outer radial ribs of the tool.

100: Hearing device housing. 110: Microphone. 120: Audio channel. 130: Sealing. 140: First coupling part of hearing device housing part. 150: Second coupling part of hearing device housing part. 160: Mating/Upper/Top interface/part/flanges/sides/walls of housing part. 170: Lower/Outer enclosure/part of housing part. 180: Locking hole/-s. 190: Power source, e.g. a battery.

200: Hearing device housing lid/cover. 210: Filter. 220: Void/Cavity for receiving/holding filter. 230: Flanges/Sides/Walls of cover. 240: First coupling member of hearing device housing cover. 250: Second coupling member of hearing device housing cover. 260: Locking hole/-s.

300: Control unit/Knob

400: First/Detachable/Exchangeable/Replaceable locking pin

410: Second/Detachable/Exchangeable/Replaceable pin for locking

I: Symbolises directions of assembly and/or assembling/connecting/mounting entities II: Symbolises directions of disassembly and/or disassembling/removing/detaching entities $F_1$: First friction force $F_1$ adapted to keep a locking pin in place locked into at least one of the holes 180, 260 during normal use of the hearing device after assembly $F_2$: Second friction force $F_2$ adapted to provide detachable holding of the reserve/substitute locking pin 410 by means of the tool 20

The invention claimed is:

1. A tool for use with a hearing device, the hearing device comprising a hearing device housing and a cover, the tool comprising:

a handle;

a first pin configured to push out a locking pin that detachably couples to the cover and the hearing device housing, the first pin being fixedly coupled to the handle; and a second pin configured to detachably couple to the handle, wherein the second pin is for replacing the locking pin, and is configured to detachably couple to the cover and the hearing device housing;

wherein the second pin is releasable from the handle by sliding relative to the handle while in contact with an inner surface of the handle.

2. The tool according to claim 1, wherein the locking pin is configured to detachably couple to the cover and/or the housing by a first friction force that is sufficient to keep the locking pin in place during normal use of the hearing device.

3. The tool according to claim 1, wherein the locking pin and the second pin have a same dimension.

4. The tool according to claim 1, wherein the locking pin and the second pin are made of a same material.

5. The tool according to claim 1, wherein the handle comprises a bushing for the second pin.

6. The tool according to claim 5, wherein the bushing is made of plastic and/or rubber.

7. The tool according to claim 1, further comprising a protection cap configured to cover the second pin or the first pin when the protection cap is detachably coupled to the handle;

wherein the protection cap is transparent.

8. The tool according to claim 1, wherein the tool has an elongated configuration.

9. The tool according to claim 1, wherein the first pin has a longitudinal axis that is parallel to a longitudinal axis of the tool.

10. The tool according to claim 1, wherein the second pin has a longitudinal axis that is parallel to a longitudinal axis of the tool when the second pin is detachably coupled to the handle.

11. The tool according to claim 1, wherein the handle has an end surface configured to abut against a surface of the hearing device when the handle is being used to replace the locking pin with the second pin.

12. The tool according to claim 1, wherein the handle has an end surface, and the second pin is coupled to the end surface of the handle.

13. The tool according to claim 1, further comprising a protection cap configured to cover the second pin.

14. The tool according to claim 13, wherein when the protection cap is covering the second pin, a part of the protection cap is detachably coupled to the handle.

15. The tool according to claim 1, wherein the first pin is configured to push out the locking pin by overcoming a first friction force between the locking pin and a part of the hearing device, and wherein the second pin is configured to detachably couple to the handle by a second friction force that is lower than the first friction force, and wherein the second pin is removable from the handle by pulling the handle away from the hearing device via a pulling force that is larger than the second friction force and that is less than the first friction force.

16. The tool according to claim 1, wherein the inner surface of the handle is a part of a wall defining a slot for accommodating the second pin.

17. The tool according to claim 1, wherein the handle is configured to hold a first part of the second pin while a second part of the pin is in the hearing device.

18. The tool according to claim 17, wherein a first friction force between the handle and the first part of the second pin is less than a second friction force between the hearing device and a second part of the second pin.

19. The tool according to claim 1, wherein the second pin is releasable from the handle in response to a movement of the handle away from the hearing device while the handle is in contact with the second pin.

20. A system comprising the tool of claim 1, and the hearing device.

21. The system according to claim 20, wherein the locking pin is configured to detachably couple to the cover and/or the hearing device housing by a first friction force sufficient to keep the locking pin in place during normal use of the hearing device.

22. A tool for use with a hearing device, the hearing device comprising a hearing device housing and a cover, the tool comprising:

a handle;

a first pin configured to push out a locking pin that detachably couples to the cover and the hearing device housing, the first pin being fixedly coupled to the handle; and a second pin configured to detachably couple to the handle, wherein the second pin is for replacing the locking pin, and is configured to detachably couple to the cover and the hearing device housing;

wherein the first pin is at a first end of the handle, wherein the second pin is at a second end of the handle when the second pin is detachably coupled to the handle, wherein the second end of the handle has a slot configured to accommodate at part of the second pin, wherein the second end of the handle has an end surface outside the slot, and wherein the end surface is configured to engage a tip of the second pin when the second pin is outside the slot.

23. The tool according to claim 22, wherein the handle is operable to push the second pin partly into the hearing device when the second pin is in the slot at the second end of the handle, and wherein the handle is operable to push the second pin further into the hearing device via the end surface when the second pin is outside the slot.

* * * * *